United States Patent
Xu et al.

(10) Patent No.: US 10,924,489 B2
(45) Date of Patent: Feb. 16, 2021

(54) BUILDING TRUSTED PUBLIC BLOCKCHAIN NETWORKS BASED ON PARTICIPANTS' DIGITAL SOCIAL BEHAVIOR

(71) Applicant: International Business Machines Corporation, Armonk, NY (US)

(72) Inventors: Fenglian Xu, Hampshire (GB); Jake Turner, Ferndown (GB); Liam Grace, Eastleigh (GB); Anastasia Paterson, Guildford (GB)

(73) Assignee: International Business Machines Corporation, Armonk, NY (US)

( * ) Notice: Subject to any disclaimer, the term of this patent is extended or adjusted under 35 U.S.C. 154(b) by 86 days.

(21) Appl. No.: 15/875,421

(22) Filed: Jan. 19, 2018

(65) Prior Publication Data
US 2019/0230089 A1 Jul. 25, 2019

(51) Int. Cl.
*H04L 29/06* (2006.01)
*H04L 9/06* (2006.01)
(Continued)

(52) U.S. Cl.
CPC ........ *H04L 63/102* (2013.01); *G06F 21/6218* (2013.01); *H04L 9/0637* (2013.01);
(Continued)

(58) Field of Classification Search
CPC ..... H04L 63/12; H04L 63/102; H04L 63/123; H04L 63/0428; G06Q 30/0279; G06Q 30/0617
(Continued)

(56) References Cited

U.S. PATENT DOCUMENTS 9,342,560 B2 * 5/2016 Baldwin ............. G06F 16/9024
9,558,524 B2 * 1/2017 Madhu .................. G06F 16/951
(Continued)

FOREIGN PATENT DOCUMENTS

WO 2017/066002 A1 4/2017

OTHER PUBLICATIONS

"Hyperledger Fabric Model", https://hyperledger-fabric.readthedocs.io/en/latest/fabric_model.html#security-membership-services, Hyperledger 2017, Printed on Jan. 19, 2018, 4 pages.

*Primary Examiner* — John A Follansbee
*Assistant Examiner* — James N Fiorillo
(74) *Attorney, Agent, or Firm* — Scully, Scott, Murphy & Presser, P.C.; Tracey Robertson, Esq.

(57) ABSTRACT

A method is disclosed including receiving a request for changing a privilege of a peer of the public blockchain network, in response to receiving the request for changing the privilege, automatically submitting a trust query to a trust verification entity, receiving from the trust verification entity, a trust score associated with the peer, comparing the received trust score to a pre-determined threshold, determining, based on the comparison, that the trust score is greater than the pre-determined threshold, in response to determining that the trust score is greater than the pre-determined threshold, automatically voting that the request be granted, receiving votes of other privileged peers of the public blockchain network, determining that a number of the votes for granting the request is sufficient to grant the request, and in response to determining that the number of votes is sufficient, automatically executing the requested changing of the privilege of the peer.

16 Claims, 8 Drawing Sheets

(51) Int. Cl.
*H04L 29/08* (2006.01)
*G06F 21/62* (2013.01)
*H04W 4/21* (2018.01)
*G06Q 50/00* (2012.01)

(52) U.S. Cl.
CPC ............ *H04L 63/104* (2013.01); *H04L 67/10* (2013.01); *H04L 67/1042* (2013.01); *H04W 4/21* (2018.02); *G06Q 50/01* (2013.01)

(58) Field of Classification Search
USPC ............................................. 709/225; 705/39
See application file for complete search history.

(56) References Cited

U.S. PATENT DOCUMENTS

| | | | | |
|---|---|---|---|---|
| 9,608,829 | B2* | 3/2017 | Spanos | H04L 9/3242 |
| 9,749,140 | B2* | 8/2017 | Oberhauser | H04L 9/3247 |
| 10,135,834 | B1* | 11/2018 | Galebach | H04L 63/102 |
| 10,505,920 | B2* | 12/2019 | Kumar | G06F 8/65 |
| 2012/0290427 | A1* | 11/2012 | Reed | G06Q 50/01 |
| | | | | 705/26.2 |
| 2015/0170112 | A1* | 6/2015 | DeCastro | G06Q 20/381 |
| | | | | 705/39 |
| 2015/0350106 | A1* | 12/2015 | Whalley | H04W 12/08 |
| | | | | 709/225 |
| 2016/0012465 | A1* | 1/2016 | Sharp | G06Q 20/384 |
| | | | | 705/14.17 |
| 2016/0098723 | A1* | 4/2016 | Feeney | G06Q 20/065 |
| | | | | 705/75 |
| 2017/0244721 | A1* | 8/2017 | Kurian | H04L 63/105 |
| 2018/0088928 | A1* | 3/2018 | Smith | G06F 8/65 |
| 2018/0130050 | A1* | 5/2018 | Taylor | H04L 9/3247 |
| 2018/0205537 | A1* | 7/2018 | Wilson | G06Q 20/0658 |
| 2018/0227275 | A1* | 8/2018 | Russinovich | H04L 9/3265 |
| 2018/0309567 | A1* | 10/2018 | Wooden | H04L 9/3239 |
| 2018/0337847 | A1* | 11/2018 | Li | H04L 67/1029 |
| 2019/0004789 | A1* | 1/2019 | Mills | H04L 67/104 |
| 2019/0147505 | A1* | 5/2019 | Blass | G06Q 20/102 |
| | | | | 705/36 R |
| 2019/0166133 | A1* | 5/2019 | Frederick | H04L 63/12 |
| 2019/0173854 | A1* | 6/2019 | Beck | H04L 9/3239 |
| 2020/0019288 | A1* | 1/2020 | D'Amore | H04L 9/3239 |

* cited by examiner

BUILDING TRUSTED PUBLIC BLOCKCHAIN NETWORKS BASED ON PARTICIPANTS' DIGITAL SOCIAL BEHAVIOR

BACKGROUND

The present disclosure relates generally to blockchain networks and the automated process for approving changes to privileges of peers within a blockchain network.

When a new peer joins a public blockchain network, the new peer is often given only limited rights or powers to alter or perform other actions on the blockchain network. For example, the new peer may be prevented from performing any actions that may modify or alter the blockchain and may instead only be allowed to read the blockchain. This type of peer with such limited rights may sometimes be referred to as an unprivileged peer. A privileged peer of the blockchain network on the other hand may submit new transactions to the blockchain, execute transactions on the blockchain, or perform other similar actions. A privileged peer may also be responsive for granting privileges to unprivileged peers. For example, a privileged peer may be able to upgrade a non-privileged peer to a privileged peer or to provide an unprivileged peer with additional rights or powers in the blockchain network.

BRIEF SUMMARY

The system, method, and computer program product described herein provide automated approval of changes to privileges of peers of a public blockchain network.

In an aspect of the present disclosure, a method is disclosed including receiving, by a privileged peer of a public blockchain network, a request for changing a privilege of a peer of the public blockchain network, in response to receiving the request for changing the privilege, automatically submitting, by the privileged peer, a trust query for the peer to a trust verification entity, receiving, by the privileged peer, from the trust verification entity, a trust score associated with the peer, comparing, by the privileged peer, the received trust score to a pre-determined threshold, determining, based on the comparison, that the trust score is greater than the pre-determined threshold, in response to determining that the trust score is greater than the pre-determined threshold, automatically voting, by the privileged peer, that the request be granted, and receiving, by the privileged peer, votes of other privileged peers of the public blockchain network. The received votes are based on trust scores received by the other privileged peers from at least one trust verification entity in response to trust queries submitted by the other privileged peers responsive to a receipt of the request by the other privileged peers. The method further includes determining, by the privileged peer, that a number of the votes for granting the request is sufficient to grant the request, and in response to determining that the number of votes is sufficient, automatically executing, by the privileged peer, the requested changing of the privilege of the peer.

In aspects of the present disclosure, apparatus, systems, and computer program products in accordance with the above aspect may also be provided. Any of the above aspects may be combined without departing from the scope of the present disclosure.

BRIEF DESCRIPTION OF THE DRAWINGS

The details of the present disclosure, both as to its structure and operation, can be understood by referring to the accompanying drawings, in which like reference numbers and designations refer to like elements.

DETAILED DESCRIPTION

In a typical blockchain network, a privileged peer may decide to grant privileges to an unprivileged peer or other peers based on any individual criteria that the privileged peer decides to follow. For example, a privileged peer may decide to upgrade an unprivileged peer because the privileged peer knows the unprivileged peer, has a business association with the unprivileged peer, or for any other reason. In some cases, a privileged peer may be required to "vet" the unprivileged peer before approving the unprivileged peer for additional privileges or even privileged status within the blockchain network. Such a vetting may require significant time and effort on the part of the privileged peer either reviewing documents, tracking the unprivileged peer's history, or other similar vetting processes which may become a significant burden on the privileged peer.

In some cases, multiple privileged peers of the blockchain network may be required to vet an unprivileged peer and together make a determination on whether the unprivileged peer should be given additional privileges. Given the distributed nature of public blockchain networks where individual peers typically have no other contact with other peers, such a vetting process may incur significant usage of resources and time where, for example, some required privileged peers may not act on the vetting in a timely manner or may simply ignore a request for more privileges entirely. Accordingly, approving an unprivileged peer for additional privileges within a public blockchain network may become burdensome on the individual privileged peers that are required to vet the unprivileged peer while achieving a consensus of some or all of the privileged peers on the blockchain network to give the unprivileged peer additional privileges may be difficult or impossible to achieve.

The present disclosure solves these issues by providing a mechanism for automatically determining whether or not to grant a peer additional privileges in a public blockchain network based on digital social behavior of the peer.

Figure 1:
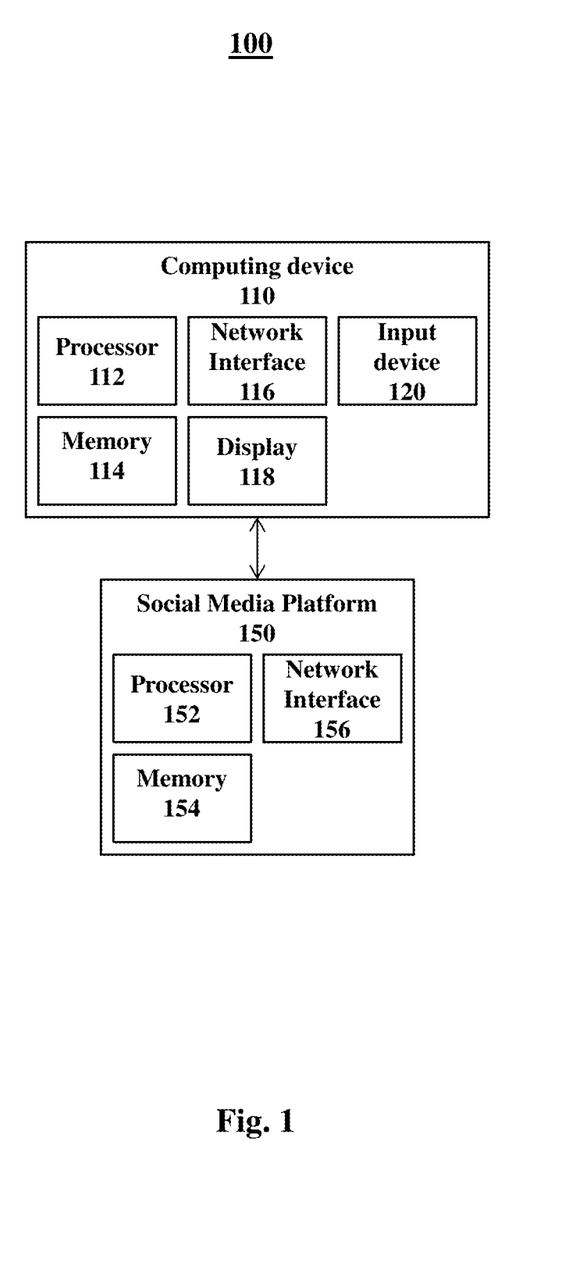
FIG. 1 is a system diagram illustrating a system in accordance with some aspects of the present disclosure.

With reference now to FIG. 1, a system 100 according to the present disclosure is illustrated. In some aspects, system 100 includes a computing device 110, and a social media platform 150.

Computing device 110 includes at least one processor 112, memory 114, at least one network interface 116, a display 118, an input device 120, and may include any other features commonly found in a computing device. In some aspects, computing device 110 may, for example, be a computing device associated with a peer of a public blockchain. In some aspects, computing device 110 may include, for example, a personal computer, laptop, tablet, smart device, smart phone, smart watch, or any other similar computing device associated with the peer. For example, a user may use the computing device 110 to participate in the public blockchain as the peer.

Processor 112 may include, for example, a microcontroller, Field Programmable Gate Array (FPGAs), or any other processor that is configured to perform various operations. Processor 112 may be configured to execute instructions as described below. These instructions may be stored, for example, in memory 114.

Memory 114 may include, for example, computer readable media or computer readable storage media in the form of volatile memory, such as random access memory (RAM) and/or cache memory or others. Memory 114 may include, for example, other removable/non-removable, volatile/non-volatile storage media. By way of non-limiting examples only, memory 114 may include a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing.

Network interface 116 is configured to transmit and receive data or information to and from a social media platform 150 or any other computing device via wired or wireless connections. For example, network interface 116 may utilize wireless technologies and communication protocols such as Bluetooth®, WIFI (e.g., 802.11a/b/g/n), cellular networks (e.g., CDMA, GSM, M2M, and 3G/4G/4G LTE), near-field communications systems, satellite communications, via a local area network (LAN), via a wide area network (WAN), or any other form of communication that allows computing device 110 to transmit or receive information to or from social media platform 150.

Display 118 may include any display device that is configured to display information to a user of computing device 110. For example, in some aspects, display 118 may include a computer monitor, television, smart television, or other similar displays. In some aspects, display 118 may be integrated into or associated with computing device 110, for example, as a display of a laptop, smart phone, smart watch, or other smart wearable devices, as a virtual reality headset associated with computing device 110, or any other mechanism for displaying information to a user. In some aspects, display 118 may include, for example, a liquid crystal display (LCD), an e-paper/e-ink display, an organic LED (OLED) display, or other similar display technologies. In some aspects, display 118 may be touch-sensitive and may also function as an input device 120.

Input device 120 may include, for example, a keyboard, a mouse, a touch-sensitive display 118, a keypad, a microphone, or other similar input devices or any other input devices that may be used alone or together to provide a user with the capability to interact with computing device 110.

Social media platform 150 includes a processor 152, memory 154, and a network interface 156 that may include similar functionality as processor 112, memory 114, and network interface 116. In some aspects, social media platform 150 may, for example, be any computing device, server, or similar system that is configured to interact with or provide data to computing device 110. In some aspects, for example, social media platform 150 may include social media web sites or applications, back end processing, or other similar devices associated with one or more social media providers, e.g., Facebook®, Twitter®, Instagram®, or any other social media provider. In some aspects, social media platform 150 may be any data repository storing data about users of social media or about users of a public blockchain network.

With reference now to FIGS. 2-8, a method 200 for automatically approving changes to privileges of peers within a public blockchain network will now be described.

Figure 3:
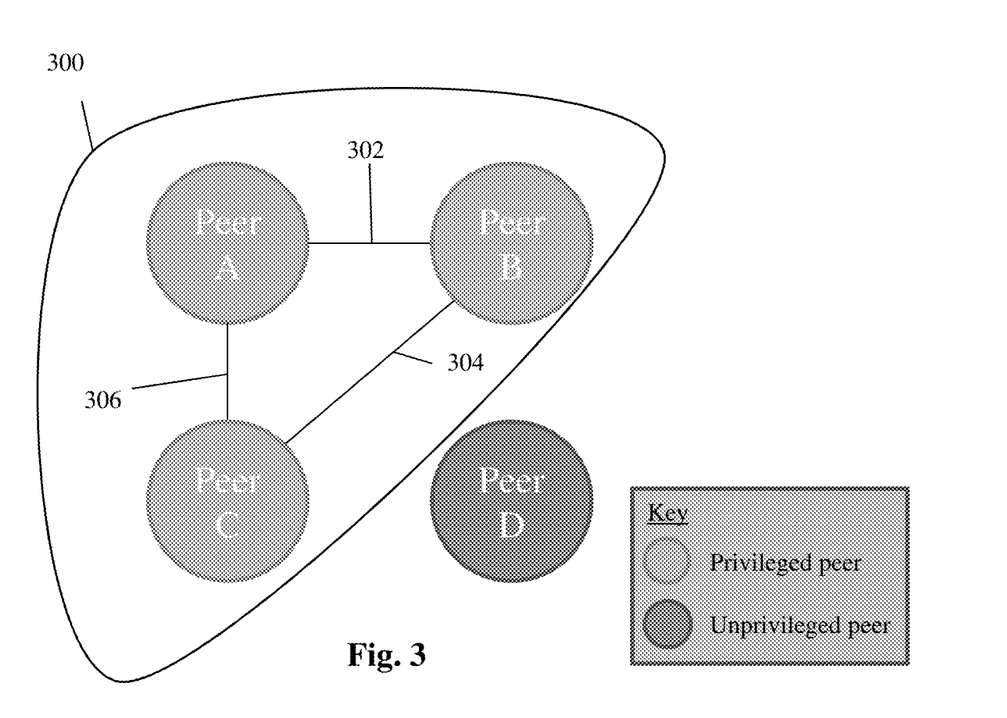
FIG. 3 is a diagram of a public blockchain network in accordance with some aspects of the present disclosure.

FIG. 3 illustrates a public blockchain network 300 including peer A, peer B, and peer C. Public blockchain network 300 may also include any number of other peers. Computing device 110 may be associated with any of peers A-C. For example, each of peers A-C may be associated with a respective computing device 110. Peer A may communicate with peer B, e.g., via a communications network connection 302, peer B may communicate with peer C, e.g., via a communications network connection 304, and peer C may communicate with peer A, e.g., via a communications network connection 306. For example, peers A-C may communicate with each other or the public blockchain network 300 using the network interfaces 116 of their respective computing devices 110. In some aspects, for example, peers A-C may communicate via the internet.

In the example illustrated in FIG. 3, each of peers A-C is a privileged peer in the public blockchain network 300. For example, a privileged peer may be responsible for granting privileges to new peers who join the network. Privileged peers may also submit network transactions which unprivileged peers do not have the authority to execute. In the example provided in FIGS. 3-8, peers A-C may be the only privileged peers on the public blockchain network 300.

As illustrated in FIG. 3, peer D is not yet part of the public blockchain network 300 network. As with peers A-C, peer D may also be associated with a computing device 110 and may be configured to communicate with one or more of peers A-C, or blockchain network 300 using the network interface 116 of the associated computing device 110.

Figure 2:
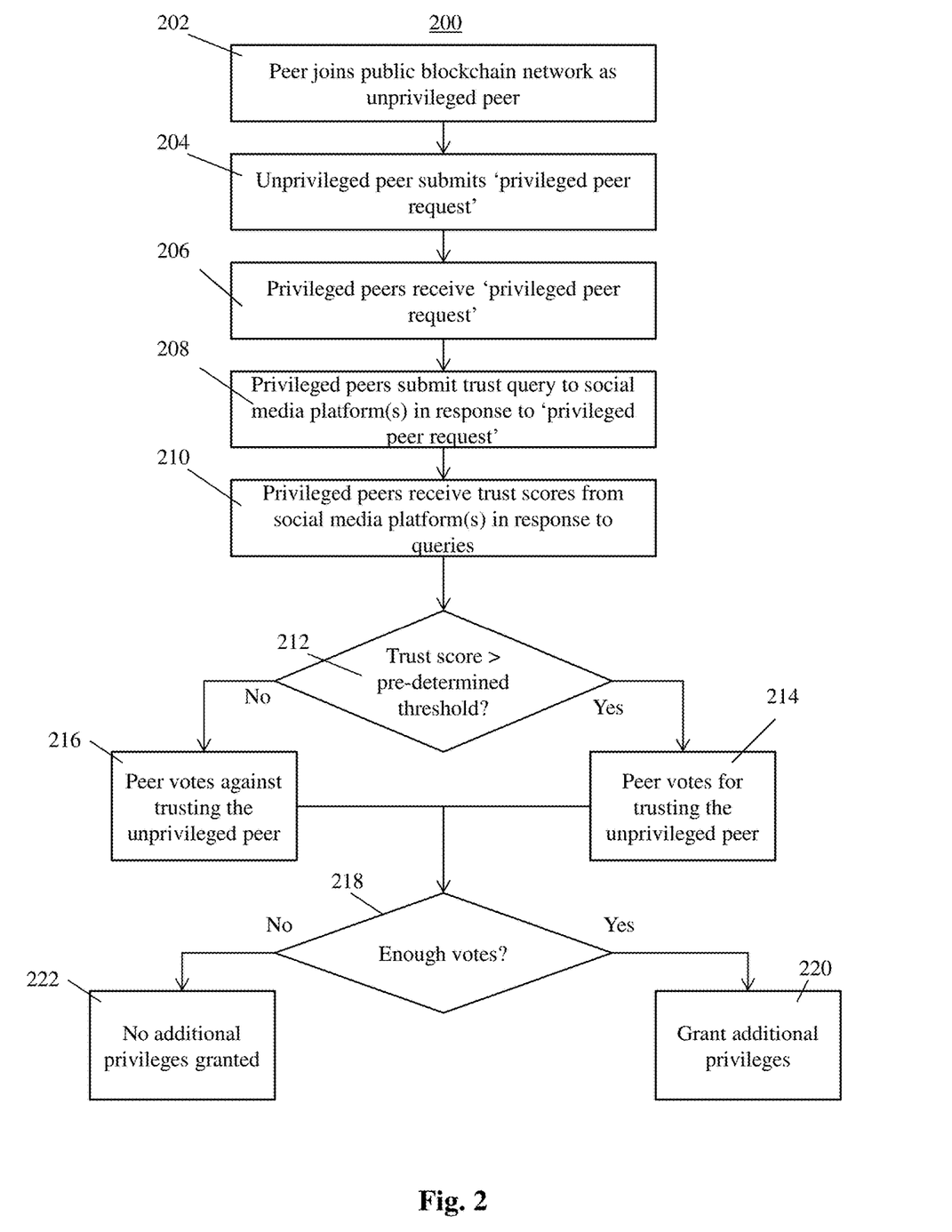
FIG. 2 is a flow chart of a method for automated approval of privilege changes in accordance with some aspects of the present disclosure.
Figure 4:
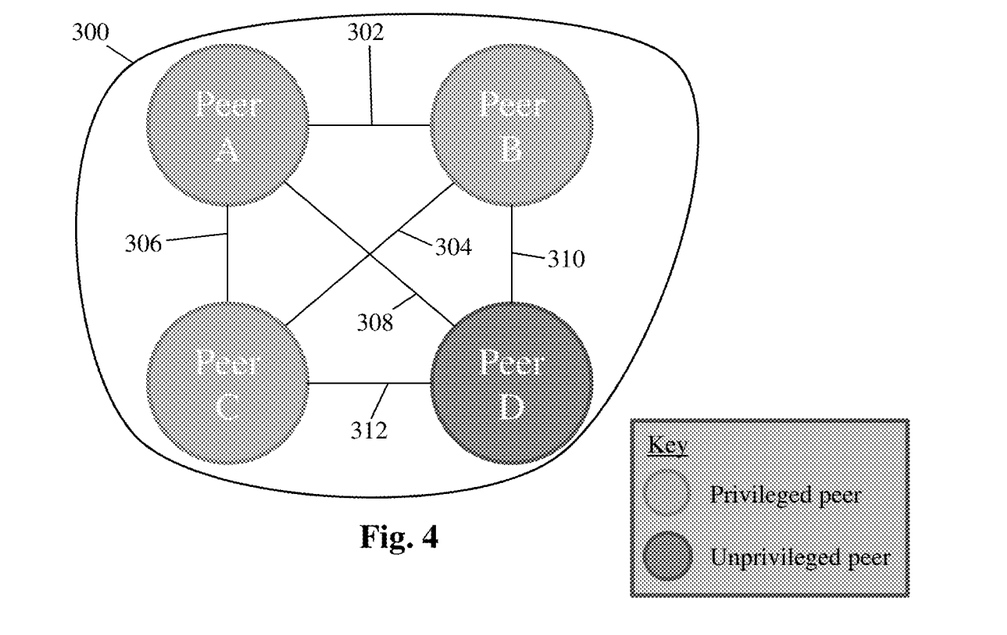
FIG. 4 is a diagram of the public blockchain network of FIG. 3 including the addition of peer D as an unprivileged peer in accordance with some aspects of the present disclosure.

Referring now to FIGS. 2 and 4, at 202, a peer D joins the public blockchain network 300 as an unprivileged peer. For example, as part of the public blockchain network 300, a communications network connection 308 may be established between peer A and peer D, a communications network connection 310 may be established between peer B and peer D, and a communications network connection 312 may be established between peer C and peer D. As an unprivileged peer, peer D is only able to view the contents of the public blockchain network 300 and submit a 'privileged peer request' transaction to the public blockchain network 300. In some aspects, a 'privileged peer request' transaction may be a request by peer D for additional privileges in the public blockchain network 300. For example, the 'privileged peer request' may request additional privileges such as, e.g., write privileges to the blockchain, or other similar privileges. In some aspects, the 'privileged peer request' may be a request to become a privileged peer in the public blockchain network 300. For example, peer D may request to become a privileged peer, similar to peers A-C.

In some aspects, the 'privileged peer request' transaction may contain identifying information associated with an account on a social media platform. In some aspects, for example, the identifying information may be an e-mail address.

At 204, peer D submits the 'privileged peer request' transaction to the public blockchain network 300. For example, the 'privileged peer request' transaction may be submitted directly to each of peers A, B, and C, or may be submitted to another node of public blockchain network 300 and forwarded to peers A, B, and C or any other privileged peer. In some aspects, the 'privileged peer request' may be submitted to a subset of the privileged peers on the public blockchain network 300. In some aspects, the 'privileged peer request' may be submitted to a randomly selected subset of privileged peers.

Figure 5:
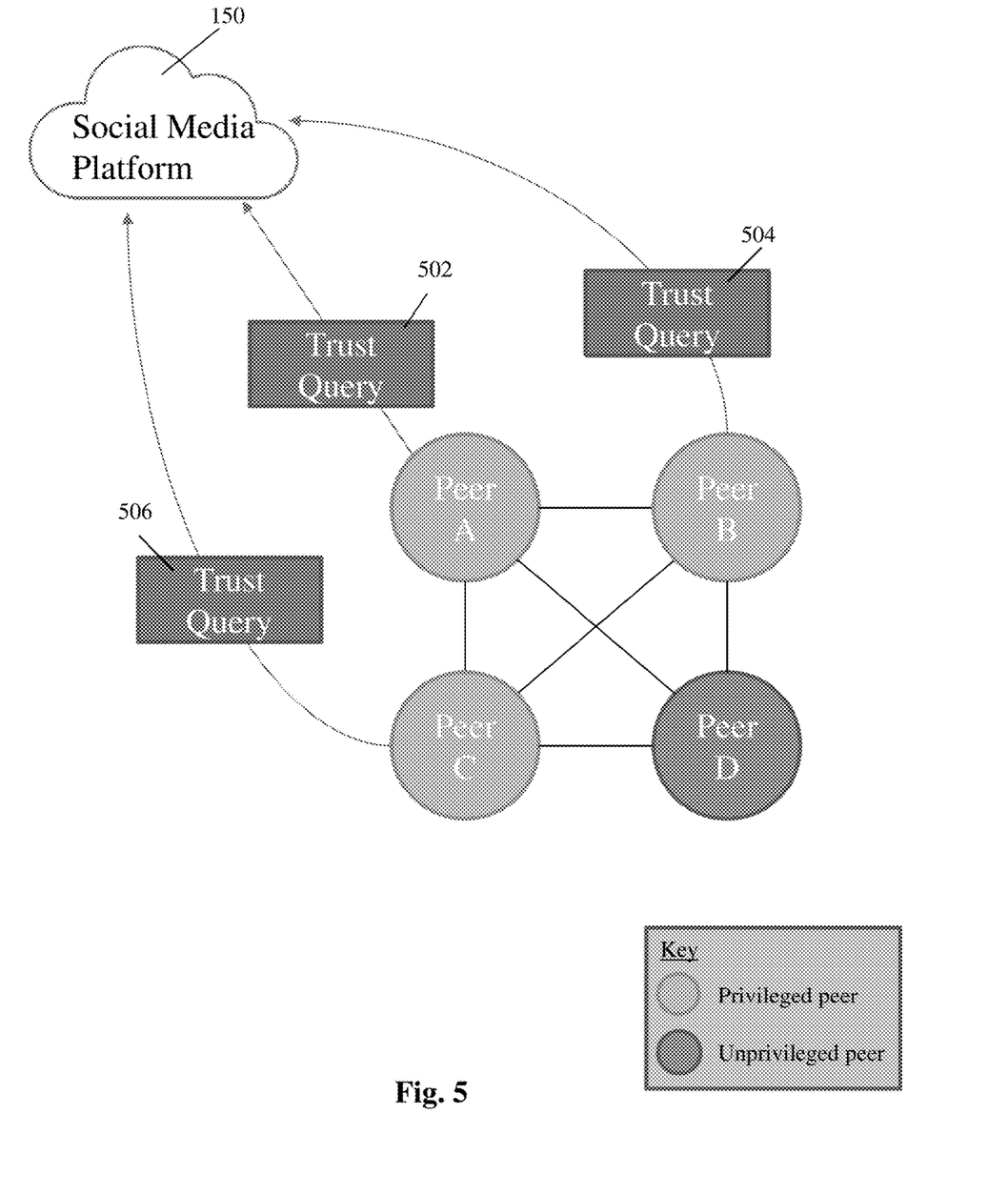
FIG. 5 is a diagram of the public blockchain network of FIG. 3 illustrating the submission of trust queries to a social media platform in accordance with some aspects of the present disclosure.

With reference now to FIGS. 2 and 5, at 206, peers A, B, and C receive the 'privileged peer request' transaction. In response to receiving the 'privileged peer request' transaction, peers A, B, and C may initiate a trust query for peer D at 208. For example, each of peers A-C may initiate trust queries 502, 504, and 506, respectively querying a social media platform 150. Social media platform 150 as used herein may be replaced with any other data source or trust verifying entity without departing from the scope of the present disclosure. The trust queries 502, 504, and 506 may be used by peers A-C to determine a score for how trustworthy the requesting peer such as, e.g., peer D, is by evaluating their social media accounts or using another trust verification source. For example, trust queries may be submitted by peers A-C to one or more social media platforms 150.

In some aspects, for example, one or more of peers A-C may submit the trust query to the same social media platform 150. In some aspects, each of peers A-C may submit the trust query to a different social media platform. In some aspects, one or more of peers A-C may submit the trust query to a first social media platform 150 while others of peers A-C may submit the trust query to at least one other social media platform 150. In some aspects, for example, peers A-C may automatically initiate trust queries 502-506 in response to a received 'privileged peer request'.

Figure 6:
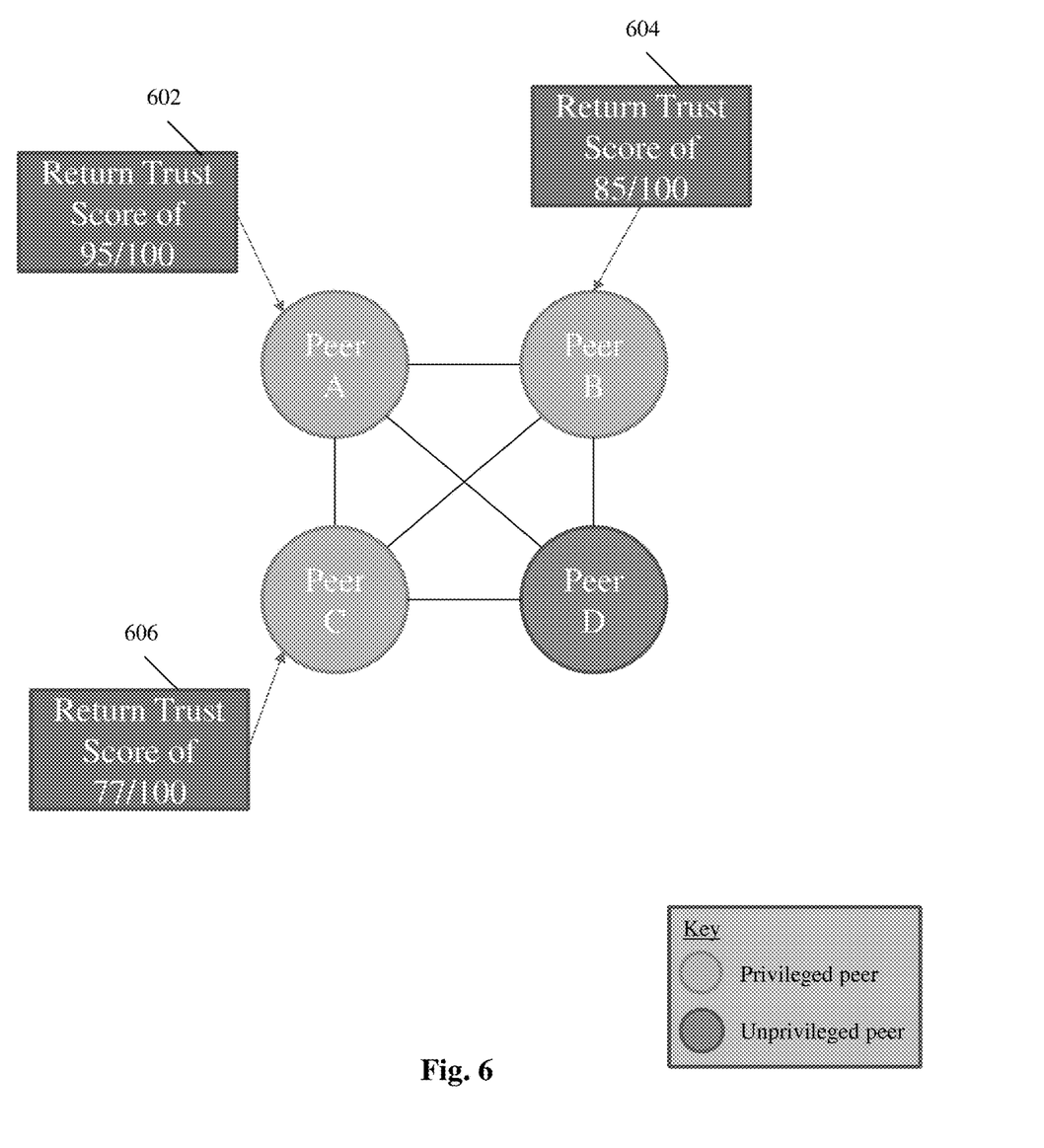
FIG. 6 is a diagram of the public blockchain network of FIG. 3 illustrating the receipt of trust scores from the social media platform in accordance with some aspects of the present disclosure.

With reference now to FIGS. 2 and 6, at 210, in response the trust queries 502-506, social media platforms 150 or other data sources may return trust scores 602, 604, and 606 to peers A-C for the requesting peer, e.g., peer D. For example, as illustrated in FIG. 6, a trust score of 95/100 may be received by peer A, a trust score of 85/100 may be received by peer B, and a trust score of 77/100 may be received by peer C. An example system for generating trust scores in a social network is disclosed in U.S. Pat. No. 9,342,560, the entire contents of which are incorporated herein by reference.

Figure 7:
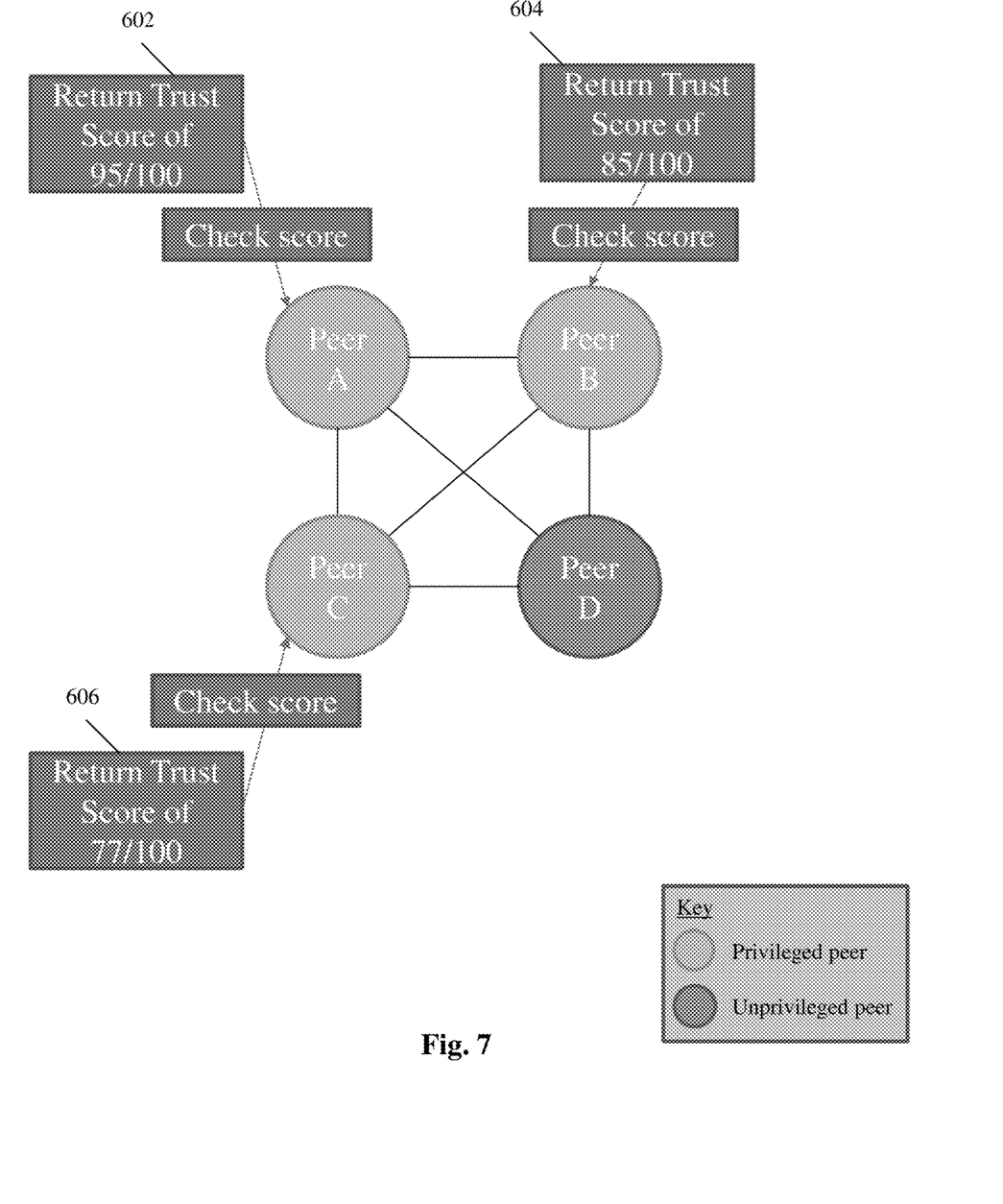
FIG. 7 is a diagram of the public blockchain network of FIG. 3 illustrating the checking of the received trust scores in accordance with some aspects of the present disclosure.

With reference now to FIGS. 2 and 7, at 212, each of peers A-C checks the respective received trust score 602-606 to determine whether the requesting peer, e.g., peer D, can be trusted. For example, peers A-C may compare the received trust score 602-606 to a pre-determine threshold. For example, the pre-determined threshold may be 50/100, 75/100, or any other threshold value. In some aspects, for example, the pre-determine threshold may be based on the social media platform from which the trust score is received. For example, trust scores received from a first social media platform 150 may be compared to a first pre-determined threshold, e.g., 50/100, while trust scores received from a second social media platform 150 may be compared to a second pre-determined threshold, e.g., 75/100.

In some aspects, for example, a pre-determined set of trust query targets, e.g., social medial platforms 150, may be pre-defined in the public blockchain network 300 along with associated pre-determined thresholds. For example, the pre-determined set of trust query targets and pre-determined thresholds may be defined as a transaction in the first block of the public blockchain network or in any other block. In some aspects, for example, the privileged peers may vote on adding a new social media platform 150 to the set of trust query targets.

Each of peers A, B and C may compare the received trust scores 602-606 to the pre-determined threshold, e.g., 50/100, to determine if the received trust score is greater than the pre-determined threshold. If the received score is determined to be greater than the pre-determined threshold, the peer A-C may vote that Peer D should be trusted at 214. If the received score is determined to be less than the pre-determined threshold, the peer A-C may vote that Peer D should not be trusted at 216. For example, if the pre-determined threshold is 50/100, peer A may compare the received trust score 602 of 95/100 to the pre-determined threshold of 50/100 and determine that the received trust score for peer D is greater than the pre-determined threshold. Peer A may then vote that peer D should be trusted. In some aspects, the vote may be for or against granting the requested privileges to peer D. In some aspects, for example, peers A-C may automatically vote for or against peer D based on the comparison to the pre-determined threshold.

Figure 8:
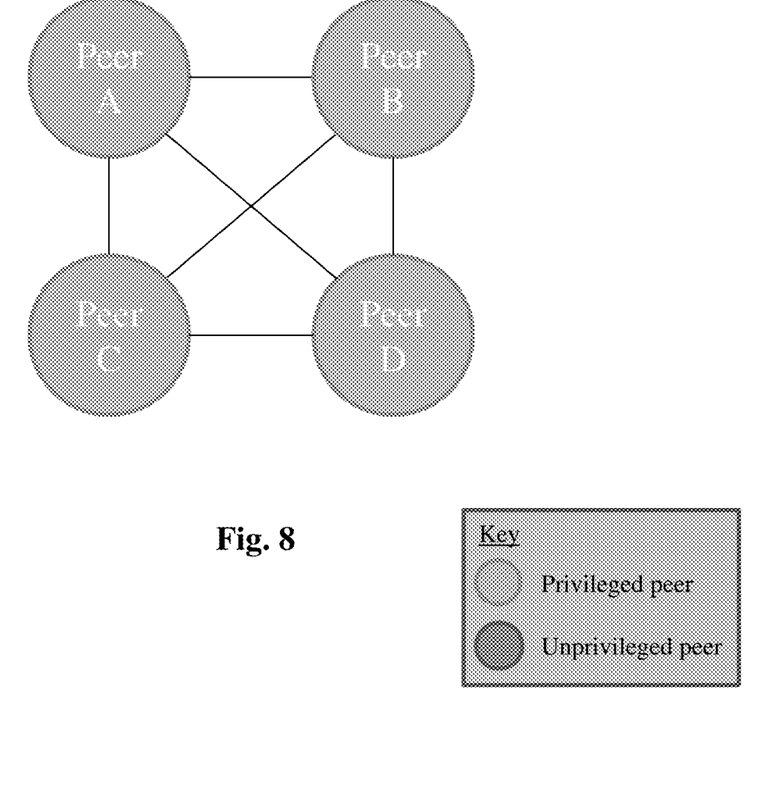
FIG. 8 is a diagram of the public blockchain network of FIG. 3 illustrating the change of privilege of peer D from an unprivileged peer to a privileged peer in accordance with some aspects of the present disclosure.

With reference now to FIGS. 2 and 8, at 218, the results of the votes are checked to determine whether enough votes for or against trusting peer D have been cast. For example, if a majority of voting peers, e.g., privileged peers A-C, vote that peer D should be trusted, peer D is granted privileged peer status in the public blockchain network 300 or is granted the requested additional privileges at 220. Otherwise, peer D remains an unprivileged peer and no additional privileges are granted at 222.

In some aspects, the trust query process described above may be publicly available on the public blockchain network 300. For example, the 'privileged peer request' transaction may be a transaction added to the blockchain. As another example, transaction details of the trust query and the received trust score may also be added to the blockchain.

In some aspects, a 'privileged peer request' transaction may be automatically initiated for any unprivileged peers on the blockchain. For example, the trust scores for unprivileged peers may be periodically checked to determine whether the unprivileged peer may be granted privileged status or additional privileges without requiring the unprivileged peers to submit the 'privileged peer request' transaction themselves.

In some aspects, a 'privileged peer request' transaction or similar transaction may be initiated for privileged peers. For example, trust scores of privileged peers may be checked to determine whether the privileged peer should remain as a privileged peer. In some aspects, for example, a privileged peer may lose privileged status if a sufficient number of trust scores are less than an associated pre-determined threshold, e.g., if enough peers vote against trusting the privileged peer. This may be a self policing mechanism for the public blockchain network 300 where privileged peers that should no longer be trusted may be removed from the public blockchain network 300.

In some aspects, if enough peers vote for trusting the privileged peer, the privileged peer may be given additional privileges. For example, the privileged peer may become a super privileged peer with privileges that allow the super privileged peer to enforce rules against regular privileged peers or perform other similar actions. In some aspects, the pre-determined threshold score or number of votes required to elevate a privileged peer to a super-privileged peer may be higher than the pre-determined threshold score or number of votes required to elevate an unprivileged peer to a privileged peer. Likewise, in some aspects, the pre-determined threshold score or number of votes required to maintain a status as a privileged peer may be lower than the pre-determined threshold score or number of votes required to elevate an unprivileged peer to a privileged peer.

Figure 9:
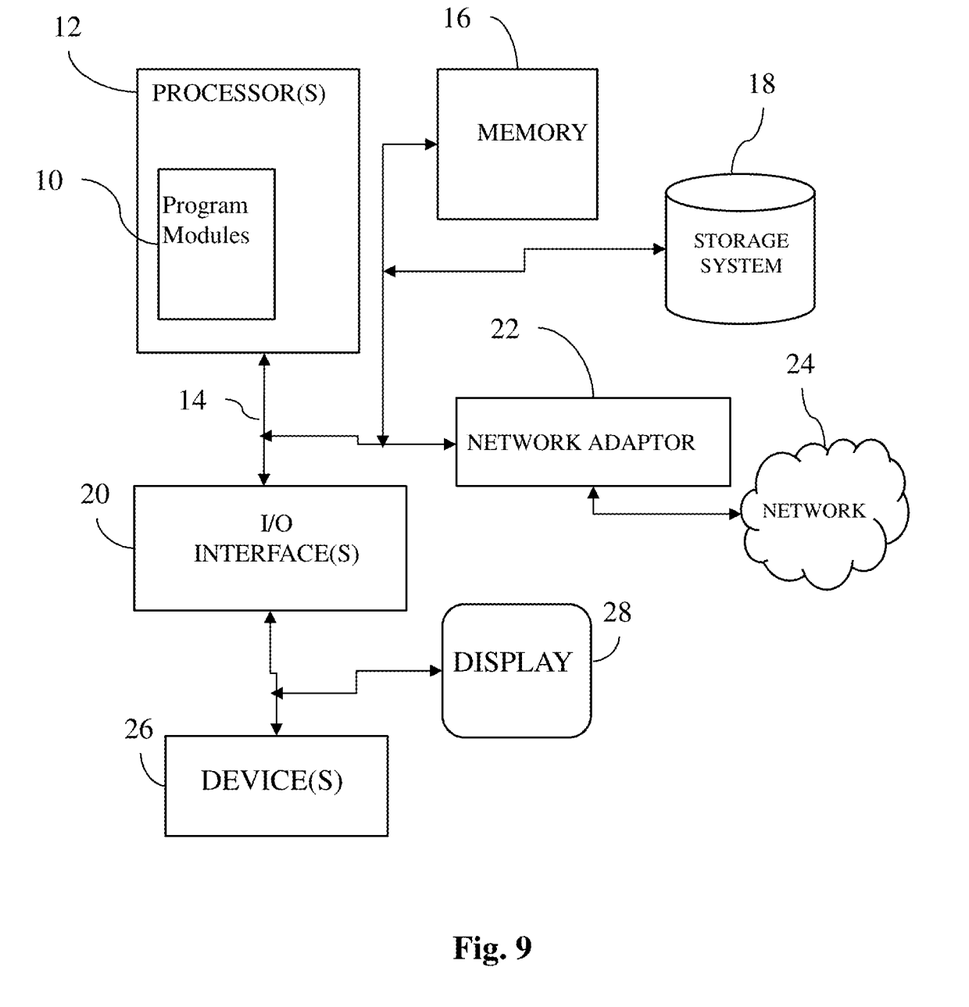
FIG. 9 is an exemplary block diagram of a computer system in which processes involved in the system, method, and computer program product described herein may be implemented.

FIG. 9 illustrates a schematic of an example computer or processing system that may implement any portion of system 100, computing device 110, social media platform 150, systems, methods, and computer program products described herein in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a software module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method implemented by at least one hardware processor comprising:
    receiving, by a privileged peer of a public blockchain network, a request for changing a privilege of a peer of the public blockchain network;
    in response to receiving the request for changing the privilege, automatically submitting, by the privileged peer, a trust query for the peer to a trust verification entity of a pre-determined set of trust verification entities;
    receiving, by the privileged peer, from the trust verification entity, a trust score associated with the peer;
    comparing, by the privileged peer, the received trust score to a pre-determined threshold, the pre-determined set of trust verification entities and the pre-determined threshold being pre-defined as a transaction in a public blockchain;
    determining, based on the comparison, whether or not the trust score is greater than the predetermined threshold;

in response to determining that the trust score is greater than the pre-determined threshold, automatically voting, by the privileged peer, that the request be granted;

in response to determining that the trust score is less than or equal to the pre-determined threshold, automatically voting, by the privileged peer, that the request be denied;

receiving, by the privileged peer, votes of other privileged peers of the public blockchain network, the received votes being based on trust scores received by the other privileged peers from at least one trust verification entity in response to trust queries submitted by the other privileged peers responsive to a receipt of the request by the other privileged peers, wherein each of the at least one trust verification entity is a social media platform, each of the received votes from respective other privileged peers determined based on a comparison of a respective trust score against a respective associated pre-determined threshold, each social media platform from which a respective trust score is received having a different associated pre-determined threshold;

determining, by the privileged peer, that a number of the votes for granting the request is sufficient to grant the request; and in response to determining that the number of votes is sufficient, automatically executing, by the privileged peer, the requested changing of the privilege of the peer, the executing of the requested changing of the privilege comprising one or more of: granting an ability of the peer to submit new transactions to the blockchain, to execute transactions on the blockchain, and to write to the public blockchain.

2. The method of claim 1 wherein the requested change of the privilege is a request to make the peer a privileged peer, and wherein automatically executing the requested changing of the privilege of the peer comprises making the peer a privileged peer.

3. The method of claim 1, wherein determining, by the privileged peer, that the number of the votes for granting the request is sufficient comprises determining that a majority of the peers voted for granting the request.

4. The method of claim 1, wherein the trust verification entity and the at least one trust verification entity are the same entity.

5. The method of claim 1, wherein the trust verification entity is different than the at least one trust verification entity.

6. The method of claim 1, wherein the request is submitted by the peer to the public blockchain network as a transaction.

7. The method of claim 1, wherein the request is automatically generated periodically by the public blockchain network.

8. A computing device associated with a privileged peer of a public blockchain network, the computing device comprising at least one processor comprising hardware, the at least one processor configured to:

receive a request for changing a privilege of a peer of the public blockchain network; in response to receiving the request, automatically submit a trust query for the peer to a trust verification entity of a pre-determined set of trust verification entities;

receive, from the trust verification entity, a trust score associated with the peer; compare the received trust score to a pre-determined threshold, the pre-determined set of trust verification entities and the pre-determined threshold being pre-defined as a transaction in a public blockchain;

determine, based on the comparison, whether or not the trust score is greater than the predetermined threshold;

in response to determining that the trust score is greater than the pre-determined threshold, automatically vote that the request be granted;

in response to determining that the trust score is less than or equal to the pre-determined threshold, automatically vote that the request be denied;

receive votes of other privileged peers of the public blockchain network, the received votes being based on trust scores received by the other privileged peers from at least one trust verification entity in response to trust queries submitted by the other privileged peers responsive to a receipt of the request by the other privileged peers, wherein each of the at least one trust verification entity is a social media platform, each of the received votes from respective other privileged peers determined based on a comparison of a respective trust score against a respective associated pre-determined threshold, each social media platform from which a respective trust score is received having a different associated pre-determined threshold;

determine whether a number of the votes for granting the request is sufficient to grant the request; and in response to determining that the number of votes is sufficient, automatically execute the requested changing of the privilege of the peer, the executing of the requested changing of the privilege comprising one or more of: granting an ability of the peer to submit new transactions to the blockchain, to execute transactions on the blockchain, and to write to the public blockchain.

9. The system of claim 8, wherein the requested change of the privilege is a request to make the peer a privileged peer, and wherein automatically executing the requested changing of the privilege of the peer comprises making the peer a privileged peer.

10. The system of claim 8, wherein determining that the number of the votes for granting the request is sufficient comprises determining that a majority of the peers voted for granting the request.

11. The system of claim 8, wherein the trust verification entity and the at least one trust verification entity are the same entity.

12. The system of claim 8, wherein the trust verification entity is different than the at least one trust verification entity.

13. The system of claim 8, wherein the request is submitted by the peer to the public blockchain network as a transaction.

14. The system of claim 8, wherein the request is automatically generated periodically by the public blockchain network.

15. The system of claim 8, wherein the peer is a privileged peer, wherein the request for changing the privilege of the peer comprises a request to verify a trust of the peer, and wherein in response to determining that the number of votes is not sufficient, automatically making the peer an unprivileged peer.

16. A computer readable storage medium comprising instructions that, when executed by at least one processor comprising hardware, configures the at least one hardware processor to:

receive a request for changing a privilege of a peer of a public blockchain network; in response to receiving the request, automatically submit a trust query for the peer to a trust verification entity of a pre-determined set of trust verification entities;

receive, from the trust verification entity, a trust score associated with the peer; compare the received trust score to a pre-determined threshold, the pre-determined set of trust verification entities and the pre-determined threshold being pre-defined as a transaction in a public blockchain;

determine, based on the comparison, whether or not the trust score is greater than the predetermined threshold;

in response to determining that the trust score is greater than the pre-determined threshold, automatically vote that the request be granted;

in response to determining that the trust score is less than or equal to the pre-determined threshold, automatically vote that the request be denied;

receive votes of other privileged peers of the public blockchain network, the received votes being based on trust scores received by the other privileged peers from at least one trust verification entity in response to trust queries submitted by the other privileged peers responsive to a receipt of the request by the other privileged peers, wherein each of the at least one trust verification entity is a social media platform, each of the received votes from respective other privileged peers determined based on a comparison of a respective trust score against a respective associated pre-determined threshold, each social media platform from which a respective trust score is received having a different associated pre-determined threshold;

determine whether a number of the votes for granting the request is sufficient to grant the request; and in response to determining that the number of votes is sufficient, automatically execute the requested changing of the privilege of the peer, the executing of the requested changing of the privilege comprising one or more of: granting an ability of the peer to submit new transactions to the blockchain, to execute transactions on the blockchain, and to write to the public blockchain.

* * * * *